United States Patent
Meyer (10) Patent No.: US 7,088,675 B1
(45) Date of Patent: Aug. 8, 2006

(54) WRAP PATH FOR COMMUNICATION RING ACCESS CONTROL

(75) Inventor: David R. Meyer, Lakewood, CO (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 892 days.

(21) Appl. No.: 10/093,762

(22) Filed: Mar. 8, 2002

(51) Int. Cl.
G01R 31/08 (2006.01)
G06F 15/177 (2006.01)

(52) U.S. Cl. ............. 370/225; 370/235; 370/244; 709/221; 709/239

(58) Field of Classification Search ......... 370/226, 370/227, 404, 237, 223, 228
See application file for complete search history.

(56) References Cited

U.S. PATENT DOCUMENTS 6,112,249 A * 8/2000 Bader et al. ............ 709/239
6,697,373 B1 * 2/2004 Sandstrom ............. 370/405
6,892,329 B1 * 5/2005 Bruckman ............... 714/43
2002/0118700 A1 * 8/2002 Bruckman ............. 370/460
2003/0112829 A1 * 6/2003 Sridhar .................. 370/522
2003/0123393 A1 * 7/2003 Feuerstraeter et al. ..... 370/235

OTHER PUBLICATIONS

Conexant SRP—MAC Overview 25 pages.
Tsiang, D., "The Cisco SRP MAC Layer Protocol," Cisco Systems, Aug. 2000, pp. 1-46.
CX29950, Ring Processing Unit (RPU) Data Sheet, 500224A, Oct. 25, 2001.

* cited by examiner

Primary Examiner—John Pezzlo
Assistant Examiner—Brian Roberts
(74) Attorney, Agent, or Firm—Setter Ollila LLC (57) ABSTRACT

Ring access control circuitry comprises a receive interface, a host interface coupled to the receive interface, a mate interface coupled to the host interface, a flow control agent coupled to the mate interface, a transmit interface coupled to the flow control agent, and a wrap path coupled from between the flow control agent and the transmit interface to between the receive interface and the host interface. A wrap is initiated over the wrap path in response to a link failure. The ring being controlled could be a resilient packet ring.

20 Claims, 8 Drawing Sheets

WRAP PATH FOR COMMUNICATION RING ACCESS CONTROL

BACKGROUND OF THE INVENTION

1. Field of the Invention

The invention is related to the field of communications, and in particular, to a wrap path for ring access control circuitry.

2. Statement of the Problem

Packet communications and communication rings are well known communication technologies. One example of packet communications is the use of the Internet Protocol (IP), and one example of a communication ring is a Synchronous Optical Network (SONET) ring. Resilient packet ring technology combines the efficiency of packet communications with the fault-tolerance of a communication ring. Resilient packet rings are described in I.E.E.E. standard 802.17.

If a link in a ring fails, then nodes adjacent to the failed link perform a wrap—a routing of traffic away from the failed link. The part of the node that performs the wrap is referred to as ring access control circuitry. Typically, a pair of rings are implemented together, and each node on the rings has mated ring access control circuits—one circuit to control each ring.

Unfortunately, there are a few problems with the current ring access control circuitry for resilient packet rings. These problems are illustrated in detail below with regard to FIGS. 1–3, but a brief summary is provided here. Current ring access control circuitry requires that a host system coupled to the node be configured to perform traffic steering away from the failed link in the event of a wrap. This may add undesirable complexity to the host. In addition, a wrap effectively disables one of the flow control agents in the ring access control circuitry of a wrapped node. As a result of losing the flow control agent, the available bandwidth at the node is significantly diminished.

SUMMARY OF THE SOLUTION

The invention helps solve the above problems with ring access control technology. Advantageously, the ring access control technology does not require that the host system be configured to perform traffic steering in the event of a link failure. This removes unwanted complexity from the host system. In addition, wrapped nodes do not lose a flow control agent during the wrap. Thus, bandwidth in a wrapped node remains on an fair basis with other unwrapped nodes.

Examples of the invention include ring access control circuitry and methods for providing ring access control. The ring access control circuitry comprises: 1) a receive interface, 2) a host interface coupled to the receive interface, 3) a mate interface coupled to the host interface, 4) a flow control agent coupled to the mate interface, 5) a transmit interface coupled to the flow control agent, and 6) a wrap path coupled from between the flow control agent and the transmit interface to between the receive interface and the host interface.

In some examples of the invention, the receive interface is configured to detect a link failure that initiates a wrap over the wrap path.

In some examples of the invention, a packet boundary detector is configured to initiate a wrap over the wrap path at a packet boundary and to release the wrap at a packet boundary.

In some examples of the invention, the receive interface comprises a framer receive FIFO, and the transmit interface comprises a framer transmit FIFO.

In some examples of the invention, the host interface is configured to provide a host system with ring access.

In some examples of the invention, the mate interface is configured to exchange traffic with a ring access control mate.

In some examples of the invention, the flow control agent is configured to control a transfer rate in response to a fairness packet.

In some examples of the invention, the flow control agent is configured to generate a fairness packet indicating a transfer rate over a congested link.

In some examples of the invention, a ring controlled by the ring access control circuitry comprises a resilient packet ring.

DESCRIPTION OF THE DRAWINGS

The same reference number represents the same element on all drawings.

DETAILED DESCRIPTION OF THE INVENTION

FIGS. 1–7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

The invention comprises circuitry and/or associated software or firmware. Although the invention is described in terms of ring access, access to other communication media could be provided in some examples of the invention. Prior to a description of the invention, a description of the prior art is given below to provide a context that should result in a better appreciation of the invention. Based on this disclosure, those skilled in the art will understand how to modify prior art implementations to make and use the invention.

Figure 1:
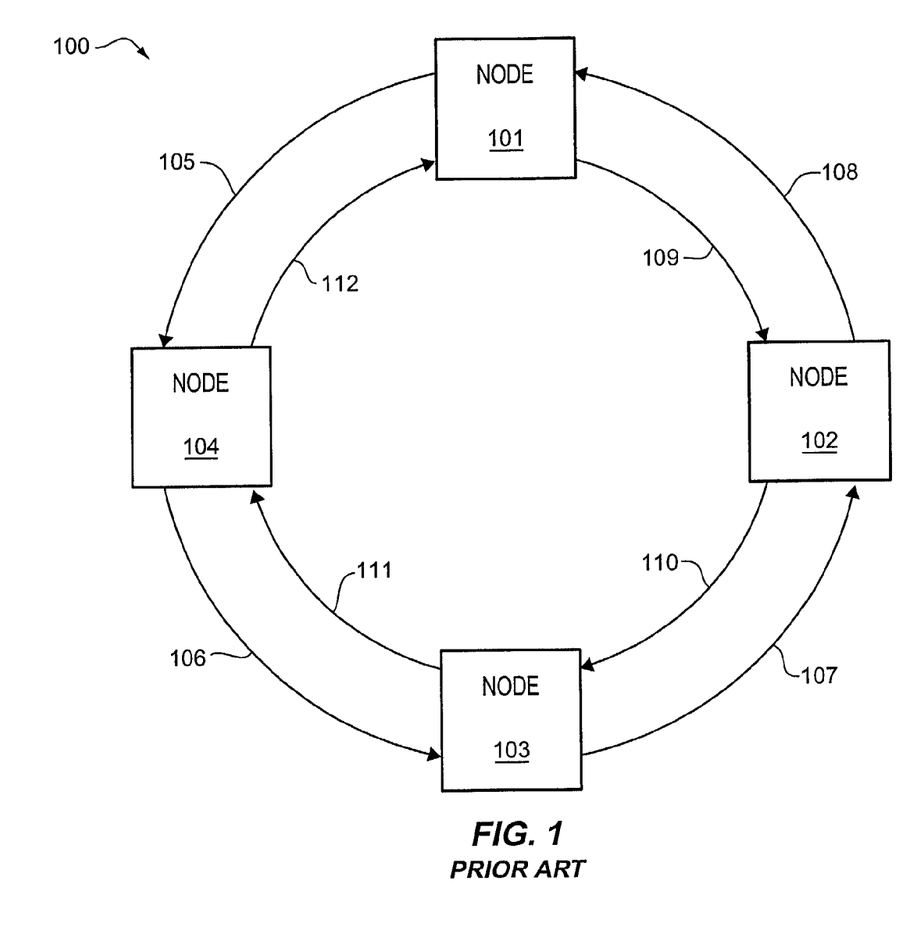
FIG. 1 illustrates a communication system in the prior art.

Prior Art Communication System—FIG. 1

FIG. 1 illustrates communication system 100 in the prior art. Communication system 100 includes nodes 101–104 coupled by links 105–112 as shown. Links 105–112 may be optical fibers. Links 105–108 form an outer communication ring and links 109–112 form an inner communication ring.

Two aspects of communication system 100 are important to this discussion: flow control and link failure.

Flow control is implemented as follows. Node 101 transfers traffic to link 105 (outer ring) at a given rate. If link 105 becomes the most congested link, then node 101 transfers fairness packets to the other nodes 102–104 indicating this rate. The other nodes 102–104 receive the fairness packets, and in response, transfer traffic to the outer ring at the rate indicated by the fairness packets. This flow control process may be initiated by other nodes 102–104 for their congested links, and the process also occurs for the inner ring. After some iterations across various congested links, a fair balance is attained where each of the nodes 101–104 obtains relatively equal access to the rings.

Link failure is handled as follows. If link 108 fails, then nodes 101 and 102 wrap traffic away from the failure. Node 101 wraps traffic from link 112 to link 105. Node 102 wraps traffic from link 107 to link 110. When the link 108 is restored, nodes 101 and 102 unwrap the traffic back to the original inner/outer ring architecture.

Figure 2:
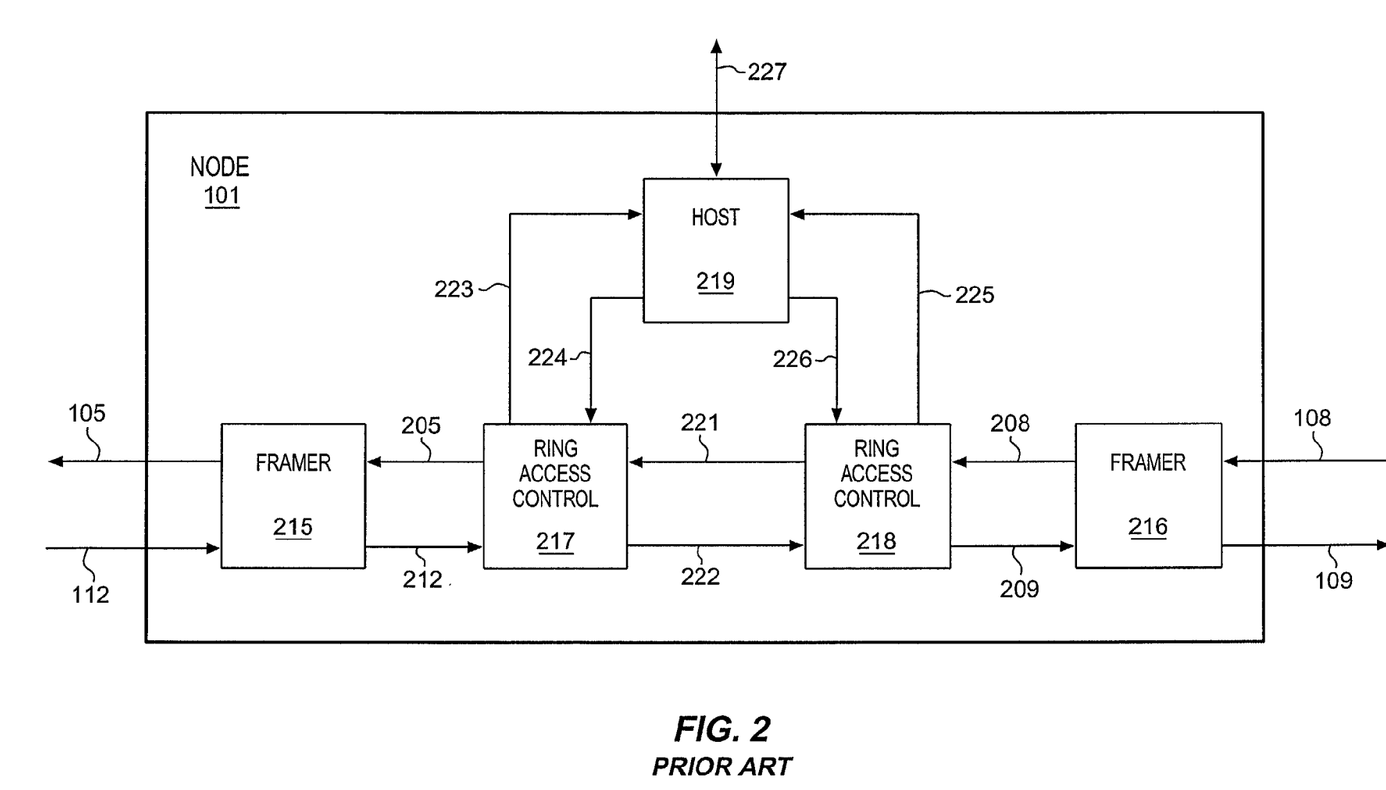
FIG. 2 illustrates a communication node in the prior art.

Prior Art Communication Node—FIG. 2

FIG. 2 illustrates communication node 101 in the prior art. Node 101 includes framers 215–216, ring access control 217–218, and host 219. Framer 215 is coupled to links 105, 112, 205, and 212. Framer 216 is coupled to links 108, 109, 208, and 209. Ring access control 217 is coupled to links 205, 212, 221, 222, 223, and 224. Ring access control 218 is coupled to links 208, 209, 221, 222, 225, and 226. Host 219 is coupled to links 223, 224, 225, 226, and 227. During normal operation, the outer ring uses links 108, 208, 221, 205, and 105; and host 219 exchanges traffic with the outer ring over links 225 and 226. During normal operation, the inner ring uses links 112, 212, 222, 209, and 109; and host 219 exchanges traffic with the inner ring over links 223 and 224.

Ring access control 218 transfers traffic to the outer ring (link 105) at a given rate. If link 105 becomes the most congested link, then ring access control 218 transfers fairness packets to the other nodes 102–104 indicating this rate. The other nodes 102–104 receive the fairness packets, and in response, transfer traffic to the outer ring at the rate indicated by the fairness packets. If ring access control 218 receives a fairness packet from one of the other nodes 102–104, then it transfers traffic to the outer ring at the indicated rate. This flow control process may be initiated by ring access control 217 for the inner ring. The other nodes 102–104 are configured and operate in a similar fashion to implement flow control.

If either link 108 or 109 fail, then ring access control 217 wraps traffic from link 212 to link 205. In addition, host 219 steers traffic from link 226 to link 224. When the failed link 108 or 109 is restored, ring access control 217 unwraps the traffic back to the original inner/outer ring architecture, and host 219 resumes normal use of link 226. If either link 105 or 112 fail, then ring access control 218 wraps traffic from link 208 to link 209. In addition, host 219 steers traffic from link 224 to link 226. When the failed link 105 or 112 is restored, ring access control 218 unwraps the traffic back to the original inner/outer ring architecture, and host 219 resumes normal use of link 224. The other nodes 102–104 are configured and operate in a similar fashion to handle link failure.

Figure 3:
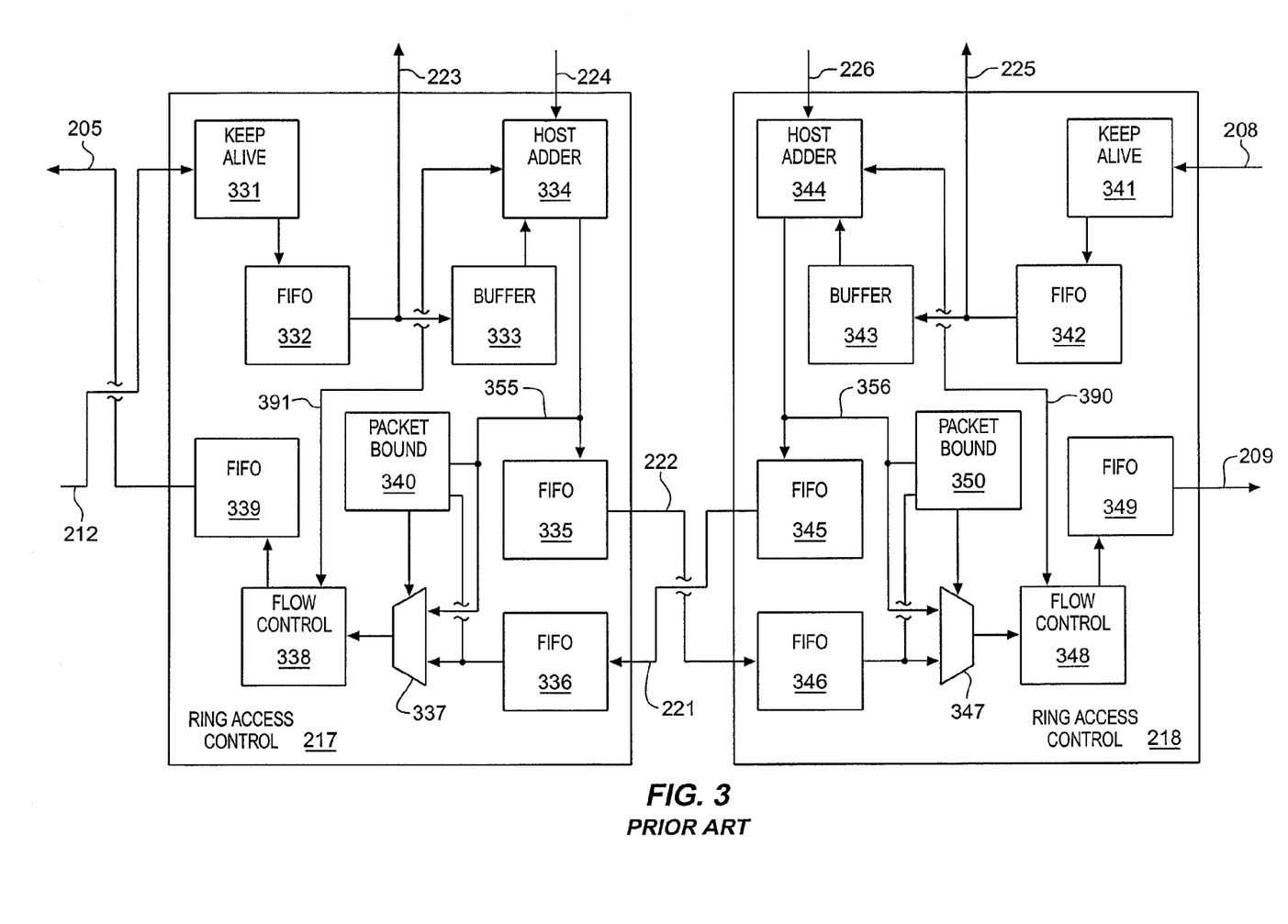
FIG. 3 illustrates ring access control in the prior art.

Prior Art Ring Access Control—FIG. 3

FIG. 3 illustrates ring access control 217 and 218 in the prior art. Ring access control 217 includes keep alive 331, framer receive FIFO 332, transit buffer 333, host adder 334, mate transmit FIFO 335, mate receive FIFO 336, mux 337, flow control agent 338, framer transmit FIFO 339, packet boundary detector 340, and wrap path 355. Keep alive 331 is coupled to link 212 and FIFO 332. FIFO 332 is coupled to link 223 and buffer 333. Buffer 333 is coupled to host adder 334. Host adder 334 is coupled to link 224, wrap path 355, and FIFO 335. FIFO 335 is coupled to link 222. FIFO 336 is coupled to link 221. Mux 337 is coupled to FIFO 336 and wrap path 355. Packet boundary detector 340 is coupled to wrap path 355, mux 337, and the path between FIFO 336 and mux 337. Flow control agent 338 is coupled to mux 337 and FIFO 339, and also to host adder 334 over link 391. FIFO 339 is coupled to link 205. Ring access control 218 includes keep alive 341, framer receive FIFO 342, transit buffer 343, host adder 344, mate transmit FIFO 345, mate receive FIFO 346, mux 347, flow control agent 348, framer transmit FIFO 349, packet boundary detector 340, and wrap path 356. Keep alive 341 is coupled to link 208 and FIFO 342. FIFO 332 is coupled to link 225 and buffer 343. Buffer 343 is coupled to host adder 344. Host adder 344 is coupled to link 226, wrap path 356, and FIFO 345. FIFO 345 is coupled to link 221. FIFO 346 is coupled to link 222. Mux 347 is coupled to FIFO 346 and wrap path 356. Packet boundary detector 350 is coupled to wrap path 356, mux 347, and the path between FIFO 346 and mux 347. Flow control agent 348 is coupled to mux 347 and FIFO 349, and also to host adder 344 over link 390. FIFO 349 is coupled to link 209.

During normal operation, the outer ring uses the following links and components: 208, 341, 342, 343, 344, 345, 221, 336, 337, 338, 339, and 205; and host adder 344 adds host traffic from link 226 to the outer ring. During normal operation, the inner ring uses the following links and components: 212, 331, 332, 333, 334, 335, 222, 346, 347, 348, 349, and 209; and host adder 334 adds host traffic from link 224 to the inner ring.

Flow control agent 348 controls host adder 344 via link 390 in order to transfer traffic to FIFO 339 (outer ring) at a given rate. If link 105 becomes the most congested link, then flow control agent 348 transfers fairness packets to the other nodes 102–104 indicating this rate. The other nodes 102–104 receive the fairness packets, and in response, transfer traffic to the outer ring at the rate indicated by the fairness packets. If flow control agent 348 receives a fairness packet from one of the other nodes 102–104, then it transfers traffic to link 205 (outer ring) at the indicated rate. This flow control process may be initiated by flow control agent 338 for the inner ring. Ring access control in the other nodes 102–104 are configured and operate in a similar fashion to implement flow control.

Keep alive 341 detects failures of link 108. In response to the failure, packet boundary detector 340 initiates a wrap, and host 219 steers traffic from link 226 to link 224. Wrap control among keep alive 341, packet boundary detector 340, and host 219 may occur through a processing interface or control link. To perform the wrap, packet boundary detector 340 controls mux 337 to switch from FIFO 336 to wrap path 355 at a packet boundary. As a result, traffic from links 212 and 224 is wrapped to link 205. Keep alive 341 detects restoration of link 108. In response to the restoration, packet boundary detector 340 initiates an unwrap, and host 219 re-steers traffic back to link 226. To perform the unwrap, packet boundary 340 controls mux 337 to switch from wrap path 355 back to FIFO 336 at a packet boundary.

Keep alive 331 detects failures of link 112. In response to the failure, packet boundary detector 350 initiates a wrap, and host 219 steers traffic from link 224 to link 226. Wrap control among keep alive 331, packet boundary detector 350, and host 219 may occur through a processing interface or control link. To perform the wrap, packet boundary detector 350 controls mux 347 to switch from FIFO 346 to wrap path 356 at a packet boundary. As a result, traffic from links 208 and 226 is wrapped to link 209. Keep alive 331 detects restoration of link 112. In response to the restoration, packet boundary detector 350 initiates an unwrap, and host 219 re-steers traffic back to link 224. To perform the unwrap, packet boundary 345 controls mux 347 to switch from wrap path 356 back to FIFO 346 at a packet boundary.

From FIGS. 1–3, a few problems may be noted. Wrap and unwrap require that the host be configured to perform steering, and this may add undesirable complexity to the host. In normal balanced operation with rings having the same bandwidth, the flow control agents will all use the same rate as indicated by the fairness messages. Thus, if each flow control agent uses a rate R, then a node with two active flow control agents will have access to a bandwidth of 2R. If the node loses a flow control agent due to a wrap, then it only has access to a bandwidth of R—even though unwrapped nodes still have access to a bandwidth of 2R.

One proposed solution is to move wrap path 355 to framer 215 and to move wrap path 356 to framer 216. Unfortunately, this would require a reconciliation of the transmit and receive clocks. The proposed solution would also effectively disable the keep alive function.

Figure 4:
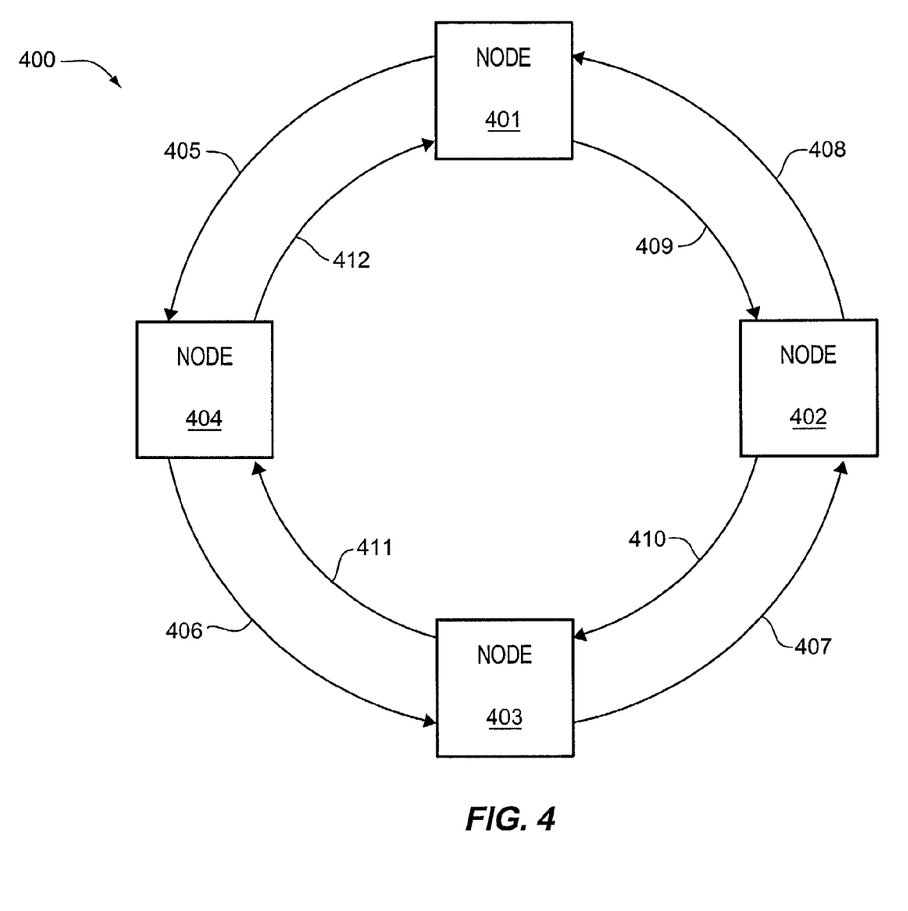
FIG. 4 illustrates a communication system in an example of the invention.

Communication System—FIG. 4

FIG. 4 illustrates communication system 400 in an example of the invention.

Communication system 400 includes nodes 401–404 coupled by links 405–412 as shown. Links 405–412 may be optical fibers. Links 405–408 form an outer communication ring and links 409–412 form an inner communication ring. Two aspects of communication system 400 are important to this discussion: flow control and link failure.

Flow control is implemented as follows. Node 401 transfers traffic to link 405 (outer ring) at a given rate. If link 405 becomes the most congested link, then node 401 transfers fairness packets to the other nodes 402–404 indicating this rate. The other nodes 402–404 receive the fairness packets, and in response, transfer traffic to the outer ring at the rate indicated by the fairness packets. This flow control process may be initiated by other nodes 402–404 for their congested links, and the process also occurs for the inner ring. After some iterations across various congested links, a fair balance is attained where each of the nodes 401–404 obtains relatively equal access to the rings.

Link failure is handled as follows. If link 408 fails, then nodes 401 and 402 wrap traffic away from the failure. Node 401 wraps traffic from link 412 to link 405. Node 402 wraps traffic from link 407 to link 410. When the link 408 is restored, nodes 401 and 402 unwrap the traffic back to the original inner/outer ring architecture.

Figure 5:
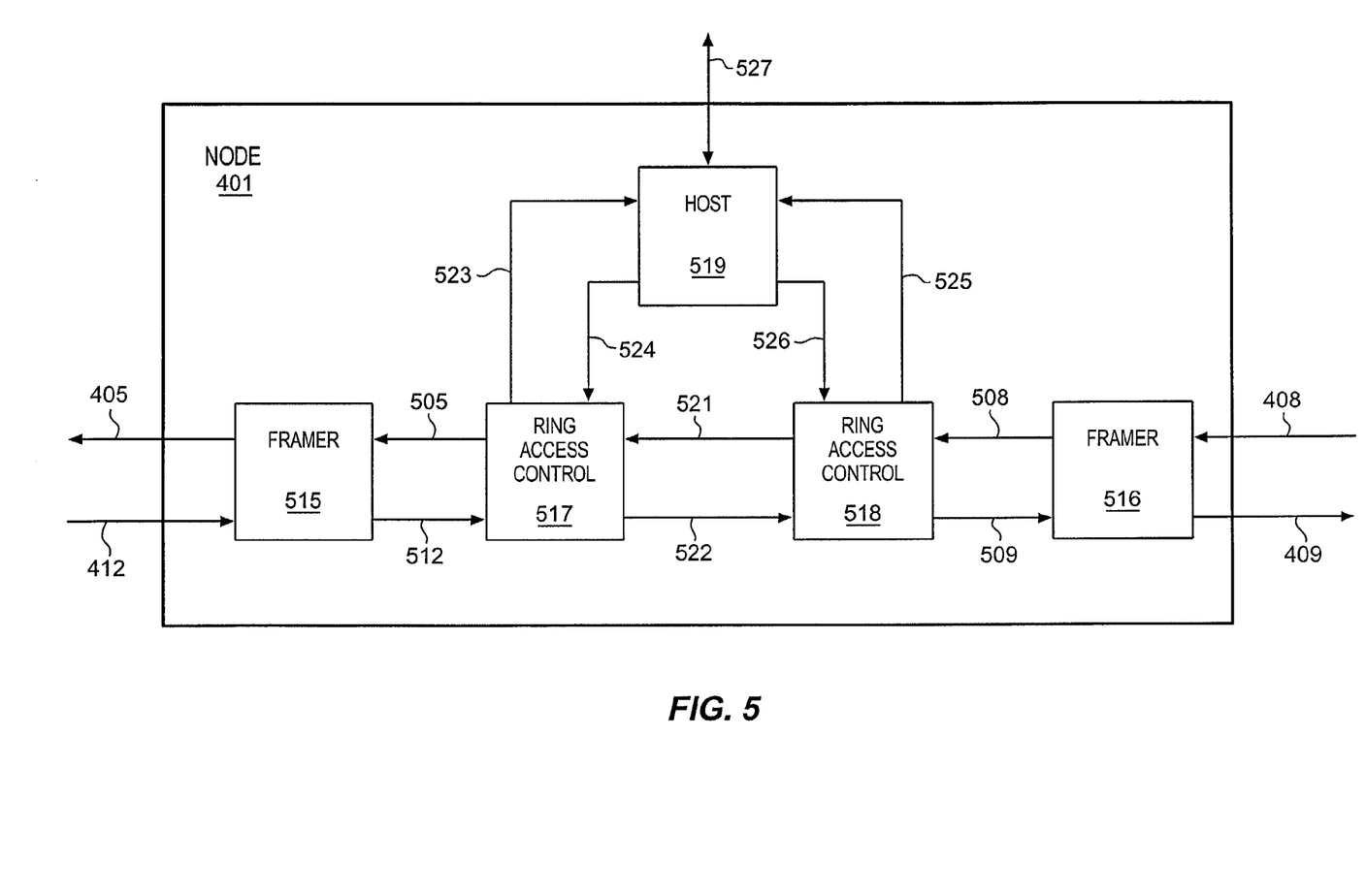
FIG. 5 illustrates a communication node in an example of the invention.

Communication Node—FIG. 5

FIG. 5 illustrates communication node 401 in an example of the invention. Node 401 includes framers 515–516, ring access control 517–518, and host 519. Framer 515 is coupled to links 405, 412, 505, and 512. Framer 516 is coupled to links 408, 409, 508, and 509. Ring access control 517 is coupled to links 505, 512, 521, 522, 523, and 524. Ring access control 518 is coupled to links 508, 509, 521, 522, 525, and 526. Host 519 is coupled to links 523, 524, 525, 526, and 527. During normal operation, the outer ring uses links 408, 508, 521, 505, and 405; and host 519 exchanges traffic with the outer ring over links 525 and 526.

During normal operation, the inner ring uses links 412, 512, 522, 509, and 409; and host 519 exchanges traffic with the inner ring over links 523 and 524.

Ring access control 518 transfers traffic to the outer ring (link 405) at a given rate. If link 405 becomes the most congested link, then ring access control 518 transfers fairness packets to the other nodes 402–404 indicating this rate. The other nodes 402–404 receive the fairness packets, and in response, transfer traffic to the outer ring at the rate indicated by the fairness packets. If ring access control 518 receives a fairness packet from one of the other nodes 402–404, then it transfers traffic to the outer ring at the indicated rate. This flow control process may be initiated by ring access control 517 for the inner ring. The other nodes 402–404 are configured and operate in a similar fashion to implement flow control.

If either link 408 or 409 fail, then ring access control 517 wraps traffic from link 512 to link 505. When the failed link 408 or 409 is restored, ring access control 517 unwraps the traffic back to the original inner/outer ring architecture. If either link 405 or 412 fail, then ring access control 518 wraps traffic from link 508 to link 509. When the failed link 405 or 412 is restored, ring access control 518 unwraps the traffic back to the original inner/outer ring architecture. The other nodes 402–404 are configured and operate in a similar fashion to handle link failure.

Figure 6:
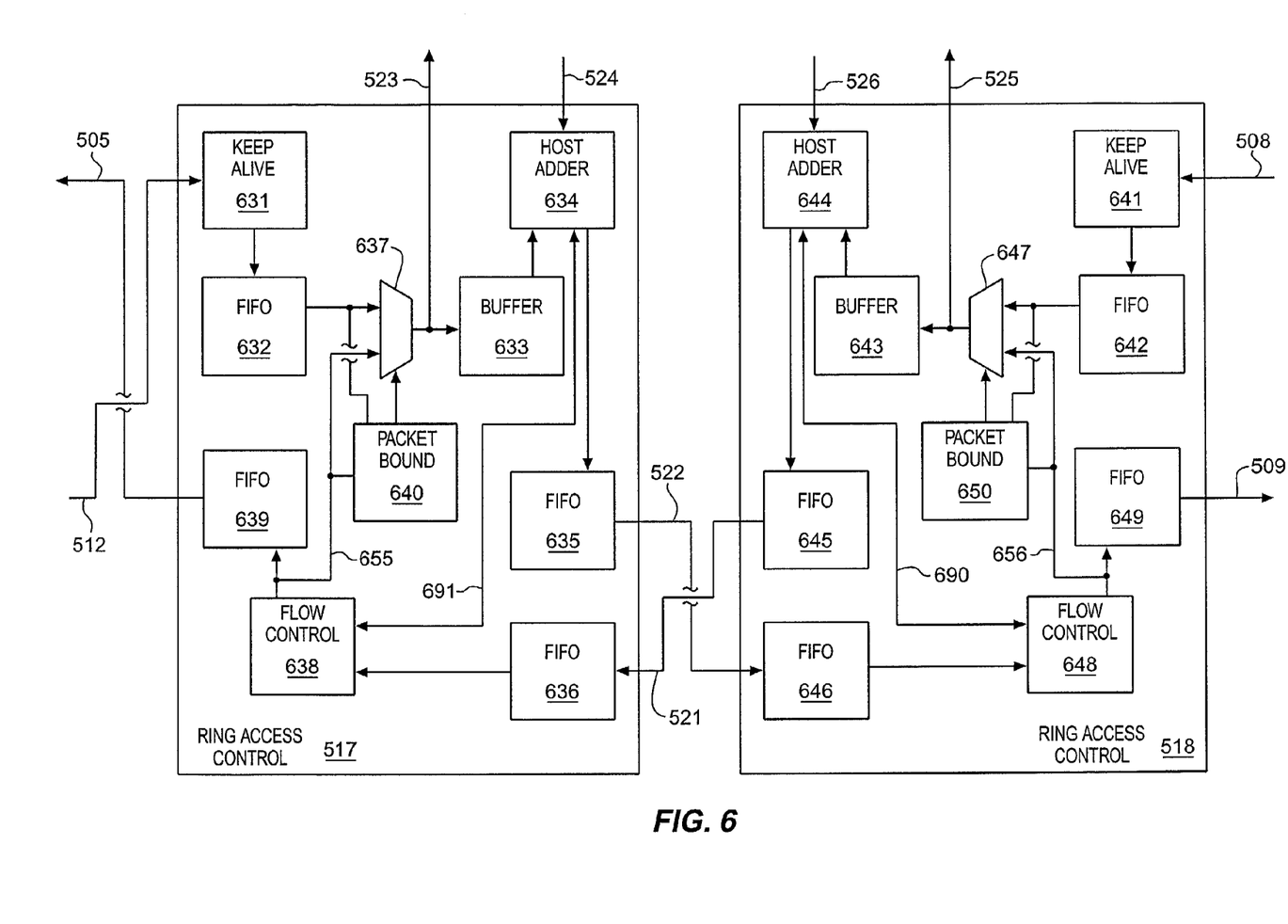
FIG. 6 illustrates ring access control in an example of the invention.

Ring Access Control—FIG. 6

FIG. 6 illustrates ring access control 517 and 518 in an example of the invention. Ring access control 517 includes keep alive 631, framer receive FIFO 632, transit buffer 633, host adder 634, mate transmit FIFO 635, mate receive FIFO 636, mux 637, flow control agent 638, framer transmit FIFO 639, packet boundary detector 640, and wrap path 655. Keep alive 631 is coupled to link 512 and FIFO 632. Packet boundary detector 640 is coupled to wrap path 655, mux 637, and the path between FIFO 632 and mux 637. Mux 637 is coupled to FIFO 632, wrap path 655, link 523, and buffer 633. Buffer 633 is coupled to host adder 634. Host adder 634 is coupled to link 524 and FIFO 635. FIFO 635 is coupled to link 522. FIFO 636 is coupled to link 521 and flow control agent 638. Flow control agent 638 is coupled to wrap path 655 and FIFO 639, and to host adder 634 over link 691. FIFO 639 is coupled to link 505. Ring access control 518 includes keep alive 641, framer receive FIFO 642, transit buffer 643, host adder 644, mate transmit FIFO 645, mate receive FIFO 646, mux 647, flow control agent 648, framer transmit FIFO 649, packet boundary detector 640, and wrap path 656. Keep alive 641 is coupled to link 508 and FIFO 642. Packet boundary detector 650 is coupled to wrap path 656, mux 647, and the path between FIFO 642 and mux 647. Mux 647 is coupled to FIFO 642, wrap path 656, link 525, and buffer 643. Buffer 643 is coupled to host adder 644. Host adder 644 is coupled to link 526 and FIFO 645. FIFO 645 is coupled to link 521. FIFO 646 is coupled to link 522 and flow control agent 648. Flow control agent 648 is coupled to wrap path 656 and FIFO 649, and to host adder 644 over link 690. FIFO 649 is coupled to link 509.

During normal operation, the outer ring uses the following links and components: 508, 641, 642, 647, 643, 644, 645, 521, 636, 638, 639, and 505; and host adder 644 adds host traffic from link 526 to the outer ring. During normal operation, the inner ring uses the following links and components: 512, 631, 632, 637, 633, 634, 635, 522, 646, 648, 649, and 509; and host adder 634 adds host traffic from link 524 to the inner ring.

Flow control agent 648 controls host adder 644 via link 690 in order to transfer traffic to FIFO 639 (outer ring) at a given rate. If link 405 becomes the most congested link, then flow control agent 648 transfers fairness packets to the other nodes 402–404 indicating this rate. The other nodes 402–404 receive the fairness packets, and in response, transfer traffic to the outer ring at the rate indicated by the fairness packets. If flow control agent 648 receives a fairness packet from one of the other nodes 402–404, then it transfers traffic to FIFO 639 (outer ring) at the indicated rate. This flow control process may be initiated by flow control agent 638 for the inner ring. Ring access control in the other nodes 402–404 are configured and operate in a similar fashion to implement flow control.

Keep alive 641 detects failures of link 408. In response to the failure, packet boundary detector 650 initiates a wrap. Wrap control among keep alive 641 and packet boundary detector 650 may occur through a processing interface or control link. To perform the wrap, packet boundary detector 650 controls mux 647 to switch from FIFO 642 to wrap path 656 at a packet boundary. As a result, traffic from links 512, 524, and 526 is wrapped to link 505. Keep alive 641 detects restoration of link 408. In response to the restoration, packet boundary detector 650 initiates an unwrap. To perform the unwrap, packet boundary 650 controls mux 647 to switch from wrap path 656 back to FIFO 642 at a packet boundary.

Keep alive 631 detects failures of link 412. In response to the failure, packet boundary detector 640 initiates a wrap. Wrap control among keep alive 631 and packet boundary detector 640 may occur through a processing interface or control link. To perform the wrap, packet boundary detector 640 controls mux 637 to switch from FIFO 632 to wrap path 655 at a packet boundary. As a result, traffic from links 508, 524, and 526 is wrapped to link 509. Keep alive 631 detects restoration of link 412. In response to the restoration, packet boundary detector 640 initiates an unwrap. To perform the unwrap, packet boundary 640 controls mux 637 to switch from wrap path 655 back to FIFO 632 at a packet boundary.

From FIGS. 4–6, a few advantages may be noted. Wrap and unwrap no longer require that the host be configured to perform steering. This removes undesirable complexity from the host. In addition, nodes no longer lose a flow control agent due to a wrap. Thus, bandwidth in a wrapped node remains on an fair basis with unwrapped nodes.

Figure 7:
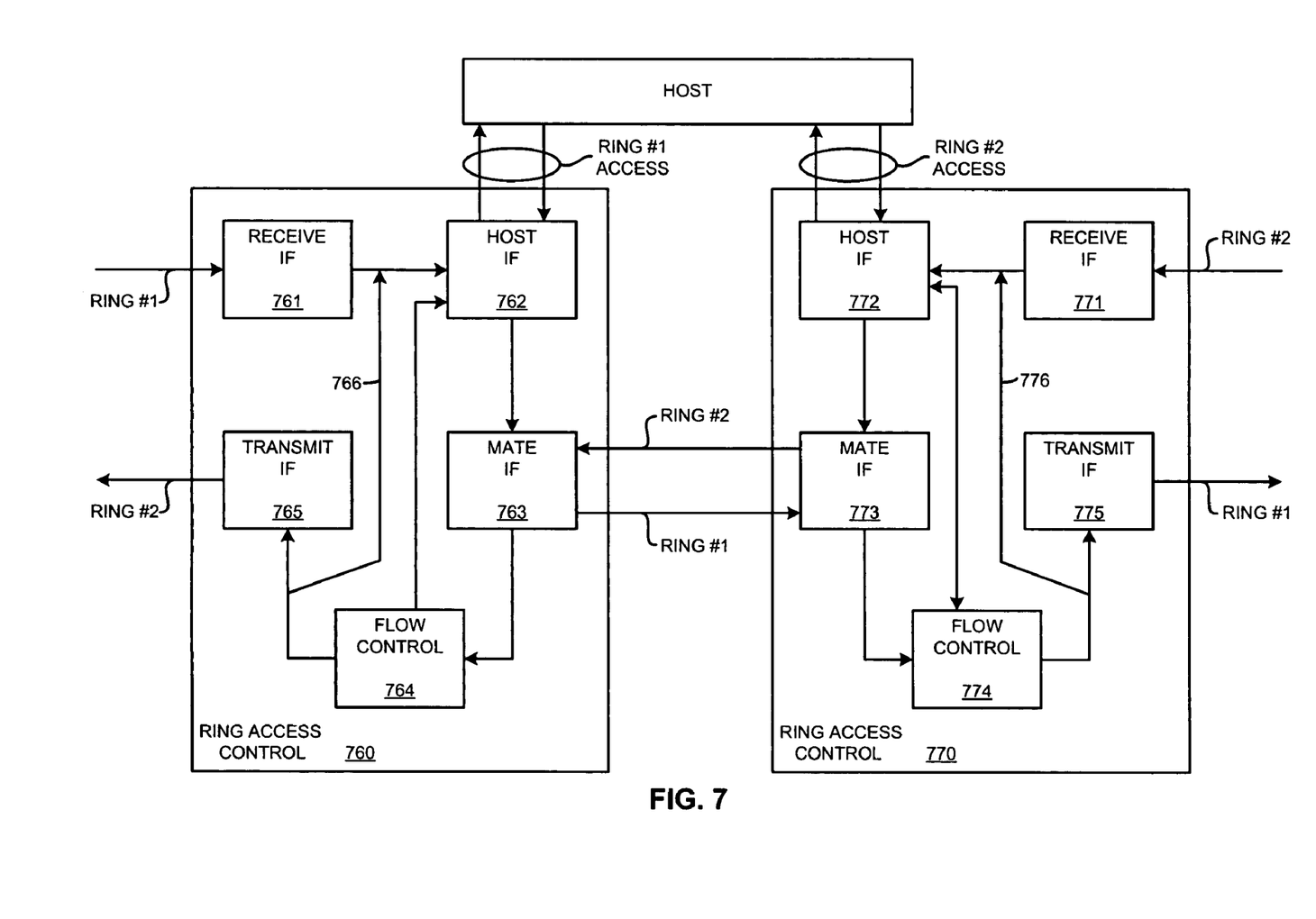
FIG. 7 illustrates ring access control in an example of the invention.

Ring Access Control—FIG. 7

FIG. 7 illustrates ring access control 760 and 770 in an example of the invention. Ring access control 760 includes receive interface 761, host interface 762, mate interface 763, flow control agent 764, transmit interface 765, and wrap path 766. Ring access control 770 includes receive interface 771, host interface 772, mate interface 773, flow control agent 774, transmit interface 775, and wrap path 776. Receive interface 761 is coupled to ring #1, and receive interface 771 is coupled to ring #2. Receive interface 761 is coupled to host interface 762, and receive interface 771 is coupled to host interface 772. Host interface 762 provides host access to ring #1, and host interface 772 provides host access to ring #2. Host interface 762 is coupled to mate interface 763 and flow control agent 764, and host interface 772 is coupled to mate interface 773 and flow control agent 774. Mate interfaces 763 and 773 are coupled together to exchange traffic for rings #1 and #2. Mate interface 763 is coupled to flow control agent 764, and mate interface 773 is coupled to flow control agent 774. Flow control agent 764 is coupled to transmit interface 765, and flow control agent 774 is coupled to transmit interface 775. Transmit interface 765 is coupled to ring #2, and transmit interface 775 is coupled to ring #1. In ring access control 760, wrap path 766 is coupled from between flow control agent 764 and transmit interface 765 to between receive interface 761 and host interface 762. In ring access control 770 wrap path 776 is coupled from between flow control agent 774 and transmit interface 775 to between receive interface 771 and host interface 772. During normal operation, ring #1 uses the following components: 761, 762, 763, 773, 774, and 775; and host interface 762 adds host traffic to ring #1. During normal operation, ring #2 uses the following components: 771, 772, 773, 763, 764, and 765; and host interface 772 adds host traffic to ring #2.

Flow control agent 774 controls host interface 772 to transfer traffic to transmit interface 765 for ring #2 at a given rate. If the proximate downstream link for ring #2 becomes the most congested link, then flow control agent 774 transfers fairness packets to the other nodes indicating this rate. The other nodes receive the fairness packets, and in response, transfer traffic to ring #2 at the rate indicated by the fairness packets. If flow control agent 774 receives a fairness packet from one of the other nodes, then it transfers traffic to transmit interface 765 for ring #2 at the indicated rate. This flow control process may be initiated by flow control agent 764 for ring #1.

Receive interface 761 detects failures of the proximate upstream link for ring #1. In response to the failure, wrap path 766 performs a wrap by routing traffic from flow control agent 764 to host interface 762. As a result, traffic received by receive interface 771 from ring #2 and traffic received by host interface 772 for ring #2 is wrapped and eventually transmitted by transmit interface 775 to ring #1. Receive interface 761 detects restoration of the proximate upstream link for ring #1. In response to the restoration, wrap path 766 performs an unwrap by routing traffic from flow control agent 764 back to transmit interface 765.

Receive interface 771 detects failures of the proximate upstream link for ring #2. In response to the failure, wrap path 776 performs a wrap by routing traffic from flow control agent 774 to host interface 772. As a result, traffic received by receive interface 761 from ring #1 and traffic received by host interface 762 for ring #1 is wrapped and eventually transmitted by transmit interface 765 to ring #2. Receive interface 771 detects restoration of the proximate upstream link for ring #2. In response to the restoration, wrap path 776 performs an unwrap by routing traffic from flow control agent 774 back to transmit interface 775.

Figure 8:
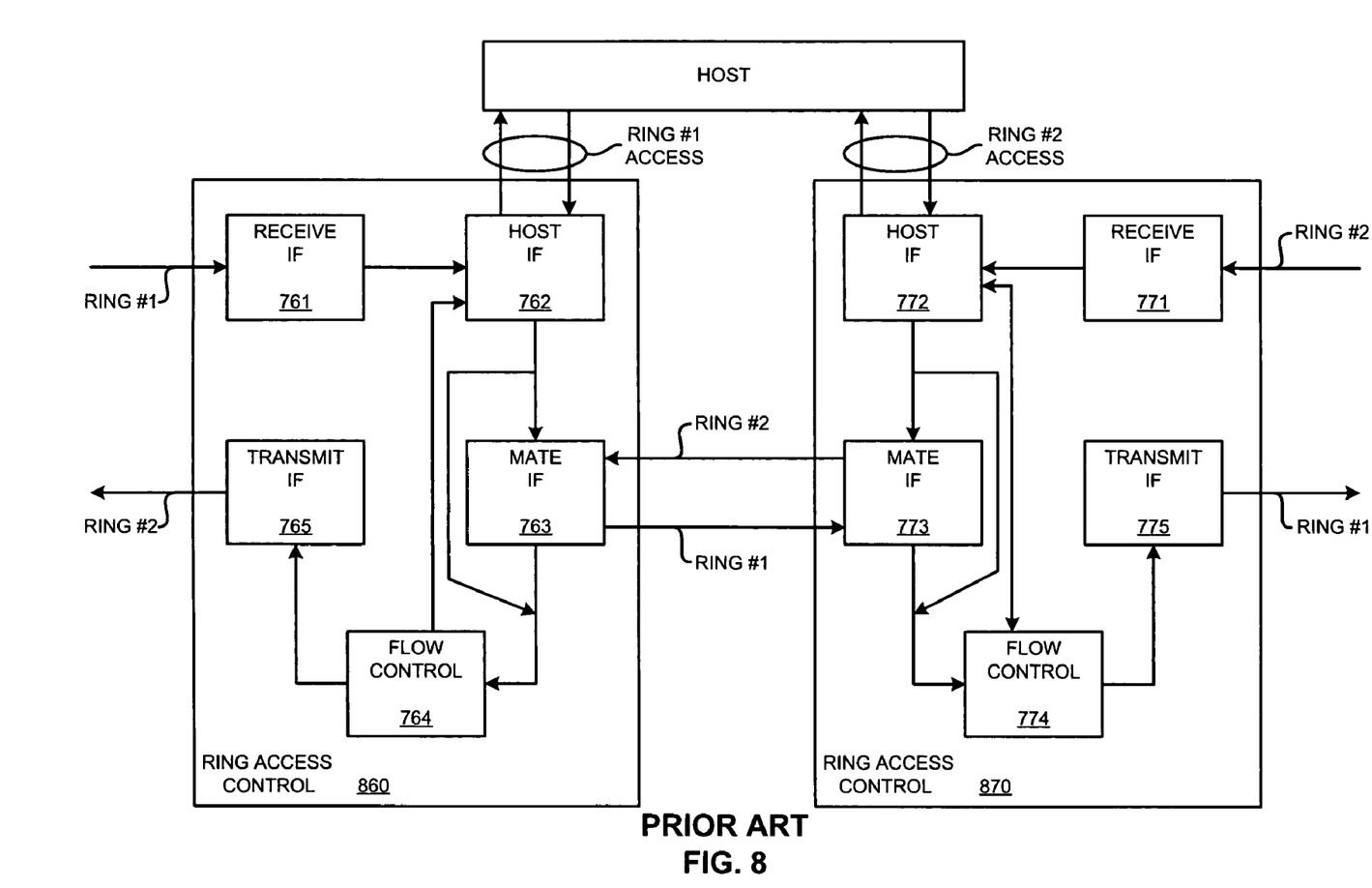
FIG. 8 shows prior art ring access control devices.

FIG. 8 shows prior art ring access control devices 860 and 870. In contrast to the invention, the prior art ring access control 860 has a wrap path extending around the mate interface 763 and the prior art ring access control 870 has a wrap path extending around the mate interface 773. In the prior art after a ring #1 failure detected by receive interface 761, the wrap path in ring access control 870 would wrap ring #2 (from 771–772) to ring #1 (through 774–775). This effectively disables flow control agent 764 to significantly reduce the available bandwidth. In addition, the host would steer traffic away from ring #1 (host interface 762) and to ring #2 (host interface 772). Likewise, after a ring #2 failure detected by receive interface 771, the wrap path in ring access control 860 would wrap ring #1 (from 761–762) to ring #2 (through 764–765). This effectively disables flow control agent 774 to significantly reduce the available bandwidth. In addition, the host would steer traffic away from ring #2 (host interface 772) and to ring #1 (host interface 762).

This prior art architecture has a few problems. Wrap and unwrap require that the host be configured to perform steering, and this may add undesirable complexity to the host. In addition, the disabling of a flow control agent during wrap cause a significant loss of bandwidth. In contrast, in the embodiment of FIG. 7, the positioning of new wrap paths 766 and 776 has advantages. Wrap and unwrap no longer require that the host be configured to perform steering. This relieves the host of some undesirable complexity. In addition, flow control agents are not lost during a wrap, and thus, bandwidth remains on an fair basis with unwrapped nodes.

ALTERNATIVE EMBODIMENT

As an alternative to the new wrap paths of FIG. 6 or 7, the prior art wrap paths of FIG. 3 or 7 could be retained without the bandwidth penalty during wrap if an adjustment is made to the flow control agent. As noted above, the flow control agent controls the transfer rate for traffic from the host in response to fairness packets. In a wrap condition, one of the flow control agents is lost. If the remaining flow control agent increases its transfer rate in response to the wrap condition, then the loss of the other flow control agent does not cause a corresponding loss in available bandwidth. Advantageously, this alternative retains the hot-pluggable replacement feature of prior art systems that may be lost in some examples of the above-described embodiments.

For example on FIG. 3, flow control agent 338 would be configured to increase the transfer rate from the host through host adder 334 if a wrap is initiated over wrap path 355. This increase could be a multiple, such as two, of the transfer rate currently indicated by the fairness packets. Even though the bandwidth of flow control agent 348 is lost due to the wrap, this loss is offset by the bandwidth increase of flow control agent 338. In response to an unwrap condition, flow control agent 338 would remove the increase to return to the transfer rate indicated by the fairness packets. Flow control agent 348 could be configured to operate in a similar fashion for a wrap over wrap path 356. Other operations for communication system 100, node 101, and ring access control 217–218 could remain as described above.

For the alternative embodiment, the prior art wrap paths indicated by dashed lines on FIG. 7 would be retained, and wrap paths 766 and 776 would be omitted. Operation in the alternative embodiment is as follows. Receive interface 761 receives ring traffic from the first ring. Host interface 762 adds host traffic to the ring traffic at a transfer rate. In an unwrap condition, mate interface 763 transfers the ring traffic and the host traffic to mate ring access control circuitry 770. In a wrap condition, transmit interface 765 transfers the ring traffic and the host traffic to the second ring. The dashed line wrap path routes the ring traffic and the host traffic to transmit interface 765 instead of the mate interface 763 in response to the wrap condition. Flow control agent 764 also increases the transfer rate from the host in response to the wrap condition. This increase could be a doubling of the transfer rate. Flow control agent 764 removes the increase in response to the unwrap condition. Ring access control circuitry 770 and flow control agent 774 could be configured in a similar fashion.

Flow control units are comprised of processing circuitry that retrieves and executes processing instructions from storage media. The processing instructions could be software, firmware, or some other type of machine-readable instructions. When executed by the processing circuitry, the processing instructions direct operation of the flow control unit. The processing instructions for prior art ring access control flow control units are known in the art. Based on this disclosure, those skilled in the art will appreciate how to modify existing flow control agents and associated processing instructions to make and use this alternative embodiment of the invention.

The invention claimed is:

1. Ring access control circuitry comprising:
a receive interface;
a host interface coupled to the receive interface;
a mate interface coupled to the host interface;
a flow control agent coupled to the mate interface;
a transmit interface coupled to the flow control agent; and
a wrap path coupled from between the flow control agent and the transmit interface to between the receive interface and the host interface.

2. The ring access control circuitry of claim 1 wherein the receive interface is configured to detect a link failure that initiates a wrap over the wrap path.

3. The ring access control circuitry of claim 1 further comprising a packet boundary detector configured to initiate a wrap over the wrap path at a packet boundary.

4. The ring access control circuitry of claim 1 wherein the receive interface comprises a framer receive FIFO and the transmit interface comprises a framer transmit FIFO.

5. The ring access control circuitry of claim 1 wherein the host interface comprises a transit buffer.

6. The ring access control circuitry of claim 1 wherein the host interface is configured to provide a host system with ring access.

7. The ring access control circuitry of claim 1 wherein the mate interface is configured to exchange traffic with a ring access control mate.

8. The ring access control circuitry of claim 1 wherein the flow control agent is configured to control a transfer rate in response to a fairness packet.

9. The ring access control circuitry of claim 1 wherein the flow control agent is configured to generate a fairness packet indicating a transfer rate over a congested link.

10. The ring access control circuitry of claim 1 wherein a ring controlled by the ring access control circuitry comprises a resilient packet ring.

11. A method of providing ring access control using circuitry comprising a receive interface, a host interface coupled to the receive interface, a mate interface coupled to the host interface, a flow control agent coupled to the mate interface, and a transmit interface coupled to the flow control agent, the method comprising:
detecting a link failure; and
in response to the link failure, providing a wrap path from between the flow control agent and the transmit interface to between the receive interface and the host interface.

12. The method of claim 11 wherein the receive interface is configured to detect the link failure.

13. The method of claim 11 further comprising initiating a wrap over the wrap path at a packet boundary.

14. The method of claim 11 wherein the receive interface comprises a framer receive FIFO and the transmit interface comprises a framer transmit FIFO.

15. The method of claim 11 wherein the host interface comprises a transit buffer.

16. The method of claim 11 further comprising, in the host interface, providing a host system with ring access.

17. The method of claim 11 further comprising, the mate interface, exchange traffic with a ring access control mate.

18. The method of claim 11 further comprising, in the flow control agent, controlling a transfer rate in response to a fairness packet.

19. The method of claim 11 further comprising, in the flow control agent, generating a fairness packet indicating a transfer rate over a congested link.

20. The method of claim 11 wherein a ring controlled by the ring access control circuitry comprises a resilient packet ring.

* * * * *